(12) United States Patent
Bakker et al.

(10) Patent No.: US 8,242,203 B2
(45) Date of Patent: Aug. 14, 2012

(54) COVALENTLY ATTACHED NILE BLUE DERIVATIVES FOR OPTICAL SENSORS

(76) Inventors: Eric Bakker, West Lafayette, IN (US); Yu Qin, Beijing (JP)

( * ) Notice: Subject to any disclaimer, the term of this patent is extended or adjusted under 35 U.S.C. 154(b) by 711 days.

(21) Appl. No.: 11/558,633

(22) Filed: Nov. 10, 2006

(65) Prior Publication Data
US 2007/0259997 A1 Nov. 8, 2007

Related U.S. Application Data

(60) Provisional application No. 60/735,314, filed on Nov. 10, 2005.

(51) Int. Cl.
*C08L 33/06* (2006.01)
(52) U.S. Cl. .................. 524/560; 422/82.03; 422/82.06; 524/516; 524/548; 524/555; 524/556; 524/561; 526/258; 526/259; 526/260
(58) Field of Classification Search .................. 524/516, 524/548, 556, 560, 561, 555; 526/258, 259, 526/260; 422/82.03, 82.06
See application file for complete search history.

(56) References Cited

U.S. PATENT DOCUMENTS

| | | | | | |
|---|---|---|---|---|---|
| 3,756,827 | A | * | 9/1973 | Chang | 430/275.1 |
| RE27,925 | E | * | 2/1974 | Jenkins et al. | 430/281.1 |
| 4,320,940 | A | * | 3/1982 | Mueller et al. | 351/44 |
| 4,762,799 | A | | 8/1988 | Seitz et al. | |
| 5,096,799 | A | * | 3/1992 | Fujikura et al. | 430/281.1 |
| 5,275,160 | A | | 1/1994 | Lilge et al. | |
| 5,439,828 | A | | 8/1995 | Masilamani et al. | |
| 6,002,954 | A | | 12/1999 | Van Antwerp et al. | |
| 6,242,158 | B1 | * | 6/2001 | Kosaka et al. | 430/284.1 |
| 6,974,618 | B2 | * | 12/2005 | Kumacheva et al. | 428/64.1 |
| 7,201,876 | B2 | * | 4/2007 | Peper et al. | 422/82.03 |
| 7,226,563 | B2 | * | 6/2007 | Bakker et al. | 422/82.03 |
| 2003/0148142 | A1 | | 8/2003 | Fryd et al. | |
| 2003/0213691 | A1 | | 11/2003 | Peper et al. | |
| 2004/0058384 | A1 | | 3/2004 | Bakker et al. | |
| 2004/0166592 | A1 | | 8/2004 | Brennan et al. | |

FOREIGN PATENT DOCUMENTS

| | | |
|---|---|---|
| DE | 4334949 | 5/1994 |
| DE | 4324991 | 2/1995 |
| EP | 0481740 | 4/1992 |
| EP | 0529247 | 3/1993 |
| JP | 2000516580 A | 12/2000 |
| WO | WO8805533 | 7/1988 |
| WO | WO9833866 | 8/1998 |
| WO | WO02066986 | 8/2002 |
| WO | 2007146615 A2 | 12/2007 |

OTHER PUBLICATIONS

Shannon E. Stitzel et al., "Array-To-Array Transfer of an Artificial Nose Classifier", The Max Tishler Laboratory of Organic Chemistry, Department of Chemistry, Tufts University, Medford Massachusetts 02155 and Department of Mathematical Sciences, Johns Hopkins University, Baltimore, Maryland 21218, Nov. 1, 2001, pp. 5266-5271 Analytical Chemistry, vol. 73, No. 21.
Robert Retter, "Flow Cytometric Ion Detection With Plasticized Poly (Vinyl Chloride) Microspheres Containing Seletive Ionophores", Department of Chemistry, Auburn University, Auburn, Alabama 36849, and Beckman Coulter, Inc., 200 South Kraemer Blvd., Brea, California 92822, Oct. 15, 2002, pp. 5420-5424, Analytical Chemistry, vol. 74, No. 20.
Bakker, E. et al., "Carrier-Based Ion-Selective Electrodes and Bulk Optodes. 1. General Characteristics," Chem. Rev., 1997, pp. 3083-3132, vol. 97.
Bakker, E. et al. "Synthesis and characterization of neutral hydrogen ion-selective chromoionophores for use in bulk optodes," Analytica Chimica Acta, 1993, pp. 211-225, vol. 278.
Brasuel, M. et al., "Fluorescent Nanosensors for Intracellular Chemical Analysis: Decyl Methacrylate Liquid Polymer Matrix and Ion-Exchange-Based Potassium Pebble Sensors with Real-Time Application to Viable Rat C6 Glioma Cells," Anal. Chem. 2001, pp. 2221-2228, vol. 73.
Chan, W.H. et al., "Design and Characterization of Sodium-selective Optode Membranes Based on the Lipophilic Tetraester of Calix[4]arene," Analyst, 1995, pp. 1963-1967, vol. 120.
Heng, L.Y, et al., "One-Step Synthesis of K+-Selective Methacrylic-Acrylic Copolymers Containing Grafted Ionophore and Requiring No Plasticizer," Electroanalysis, 2000, pp. 178-186, vol. 12, No. 3.
Hogg, G., "Novel membrane material for ion-selective field-effect transistors with extended lifetime and improved selectivity," Analytica Chimica Acta, 1996, pp. 103-109, vol. 335.
Horn, M.B., "Reinhold Plastics Applications Series," Acrylic Resins, 1960, pp. title page, iii, 34-37, Rinehold Publishing Corp.
Kimura, K., et al., "Applications of Sol-Gel-Derived Membranes to Neutral Carrier-Type Ion-Sensitive Field-Effect Transistors," Anal. Chem., 1997, pp. 2379-2383, vol. 69.
Kimura, K., et al., "Neutral Carrier-Type Ion Sensors Based on Sol-Gel-Derived Membranes Incorporating a Bis (crown ether) Derivative by Covalent Bonding," Anal. Chem., 1998, pp. 4309-4313, vol. 70.
Kimura, K., et al., "Sol-Gel Modification of pH Electrode Glass Membranes for Sensing Anions and Metal Ions," Anal. Chem., 2001, pp. 1605-1609, vol. 73.
Lerchi, M. et al., "Lead-Selective Bulk Optodes Based on Neutral Ionophores with Subnanomolar Detection Limits," Anal. Chem., 1992, pp. 1534-1540, vol. 64.
Linder, E. et al., "Responses of H+ Selective Solvent Polymeric Membrane Electrodes Fabricated From Modified PVC Membranes," Talanta, 1993, pp. 957-967, vol. 40, No. 7.
Malinowska, E. et al., "Novel approach of immobilization of calix[4]arene type ionophore in 'self-plasticized' polymeric membrane," Analytica Chimica Acta, 2000, pp. 93-101, vol. 421.
Mi, Y. et al., "Determination of Complex Formation Constants of Lipophilic Neutral Ionophores in Solvent Polymeric Membranes with Segmented Sandwich Membranes," Anal. Chem., 1999, pp. 5279-5287, vol. 71.

(Continued)

*Primary Examiner* — David W Wu
*Assistant Examiner* — Marie Reddick
(74) *Attorney, Agent, or Firm* — Haverstock & Owens LLP

(57) ABSTRACT

A composition comprising a pH indicator, a polymerizable group, and a spacer therebetween. The polymerizable group can be acrylate or methacrylate and the spacer can be an oxyalkayl group, an oxypropyl group, or an oxybenzoyl group. The composition can be polymerized to copolymers to form indicating polymers and optodes.

22 Claims, 10 Drawing Sheets

OTHER PUBLICATIONS

Peper, S. et al., "Plasticizer-free microspheres for ionophore-based sensing and extraction based on a methyl methacrylate-decyl methacrylate copolymer matrix," Analytica Chimica Acta, 2003, pp. 127-136, vol. 500.

Puntener, M. et al., "Response and Diffusion Behavior of Mobile and Covalently Immobilized H+ -Ionophores in Polymeric Membrane Ion-Selective Electrodes," Electroanalysis, 2002, pp. 1329-1338, vol. 14, No. 19-20.

Qin, Y. et al., "A Copolymerized Dodecacarborane Anion as Covalently Attached Cation Exchanger in Ion-Selective Sensors," Anal. Chem., 2003, pp. 6002-6010, vol. 75.

Qin, Y. et al., "Elimination of Dimer Formation in InlllPorphyrin-Based Anion-Selective Membranes by Covalent Attachment of the Ionophore," Anal. Chem., 2004, pp. 4379-4386, vol. 76.

Qin, Y. et al., "Plasticizer-Free Polymer Containing a Covalently Immobilized Ca2+ -Selective Ionophore for Potentiometric and Optical Sensors," Anal. Chem., 2003, pp. 3038-3046, vol. 75.

Qin, Y et al., "Plasticizer-Free Polymer Membrane Ion-Selective Electrodes Containing a Methacrylic Copolymer Matrix," Electroanalysis, 2002, pp. 1375-1381, vol. 14, Nos. 19-20.

Reinhoudt, D.N. et al., "Development of Durable K+ -Selective Chemically Modified Field Effect Transistors with Functionalized Polysiloxane Membranes," Anal. Chem., 1994, pp. 3618-3623, vol. 66.

Shortreed, M., et al., "Miniature Sodium-Selective Ion-Exchange Optode with Fluorescent pH Chromoionophores and Tunable Dynamic Range," Anal. Chem., 1996, pp. 2656-2662, vol. 68.

Seiler, K. et al., "Principles and mechanisms of ion-selective optodes," Sensors and Actuators, 1992, pp. 295-298, vol. B. 6.

Seiler, K. et al., "Theoretical aspects of bulk optode membranes," Analytica Chimica Acta, 1992, pp. 73-87, vol. 266.

Telting-Diaz, M. et al., "Mass-Produced Ionophore-Based Fluorescent Microspheres for Trace Level Determination of Lead Ions," Anal. Chem., 2002, pp. 5251-5256, vol. 74.

Tsagkatakis, I., et al., "Monodisperse Plasticized Poly(vinyl chloride) Fluorescent Microspheres for Selective Ionophore-Based Sensing and Extraction," Anal. Chem., 2001, pp. 6083-6087, vol. 73.

Tsagkatakis, I., et al., "Spatial and Spectral Imaging of Single Micrometer-Sized Solvent Cast Fluorescent Plasticized Poly(vinyl chloride) Sensing Particles," Anal. Chem. 2001, pp. 315-320, vol. 73.

Brasuel, M. et al., "Pebble Nanosensors for Real Time Intracellular Chemical Imaging," Optical Biosensors: Present and Future, Chapter 16, 2002, pp. 497-536, Elsevier Science B.V.

Heng, L.Y. et al., "Assessing a photocured self-plasticised acrylic membrane receipe for NA+ and K+ ion selective electrodes," Analytica Chimica Acta, 2001, pp. 25-40, vol. 443.

Heng, L.Y. et al., "Taking the Plasticizer out of Methacrylic-Acrylic Membranes for K+ -Selective Electrodes," Electroanalysis, 2000, pp. 187-193, vol. 12, No. 3.

Lindner, E. et al., "The potentiometric pH response of chromoionophores used in optical sensors," J. Electroanal. Chem., 1993, pp. 309-312, vol. 352.

Qin, Y. et al., "Quantitive binding constants of H+ -selective chromoionophores and anion ionophores in solvent polymeric sensing membranes," Talanta, 2002, pp. 909-918, vol. 58.

Qin, Yu et al.,Plasticizer-FreePolymer Containing a Covalently Immobilized Ca2+. Selective Ionophore for Potentiomertric and Optical Sensors, Analytical Chemistry, vol. 75, No. 13, Jul. 1, 2003, pp. 3038-3039.

* cited by examiner

COVALENTLY ATTACHED NILE BLUE DERIVATIVES FOR OPTICAL SENSORS

CROSS REFERENCE TO RELATED APPLICATION

The present application claims priority of U.S. Provisional Patent Application No. 60/735,314, filed on Nov. 10, 2005, the entire contents of which are hereby incorporated herein by reference.

STATEMENT REGARDING FEDERALLY SPONSORED RESEARCH

The invention was made in the course of work supported by grant No. BIO8-004-00 from the National Science Foundation and by grant Nos. DE14590 and EB002189 from the National Institutes of Health. The United States government has certain rights in this invention.

BACKGROUND

The present invention is related to systems for detecting target ions in a sample and methods of use thereof in clinical laboratory instrumentation.

Throughout this application, various references are referred to within parentheses. The disclosures of these publications in their entireties are hereby incorporated by reference into this application to more fully describe the state of the art to which this invention pertains. Full bibliographic citation for these references may be found at the end of this application, preceding the claims.

An important sensing platform in ion analyses is the bulk optode, which contains a selective and lipophilic ionophore, a chromoionophore and an ion-exchanger entrapped within a polymeric film coated onto a suitable support. Chromoionophores are normally lipophilic pH indicators used in ion selective optodes. Such dyes usually require sufficient lipophilicity (log $P_{TLC}$>10.6), a large molar extinction coefficient, a high chemical and photostability and a high selectivity to $H^+$ (1, 2). Chromoionophores may be classified into neutral and charged chromoionophores, depending on the electrical charge of their unprotonated form. In the past two decades, a series of lipophilic $H^+$ selective chromoionophores of different basicities were synthesized (2). The lipophilic $H^+$ selective chromoionophores may be combined with different ionophores to design optodes with different measuring ranges for specific analytical needs (2).

Many of these chromoionophores are highly lipophilic and suitable for general applications. However, optodes based on these chromoionophores exhibit short lifetime in lipophilic samples such as undiluted serum. Further, the leaching of plasticizer and other sensor components is more dramatic when the size of the sensor is reduced to microparticles in the micro-meter range (3) or nanometer range (4, 5). Further, to prevent an inflammable response in in-vivo measurements with such sensors and to avoid cross-contamination between adjacent microspheres, the sensing components including chromoionophores are immobilized onto the polymer matrix.

In earlier work, chromoionophores have been covalently attached onto functionalized poly(vinyl chloride) (6, 7) and onto polyurethane matrices (8), but such polymers could not be used without plasticizer and lead to longer response time. On the other hand, immobilization of non-chromogenic ionophores onto polymers has been more widely studied. Ionophores selective for $Na^+$, $K^+$ and $Pb^{2+}$ have been covalently grafted to a polysiloxane matrix and applied to the fabrication of CHEMFET sensors (9, 10).

Kimura introduced a sol-gel technique to immobilize ionophores and ion exchangers (11, 12, 13). Another direction in ionophore grafting is to copolymerize the polymerizable ionophores with blank polymers by a one-step solution polymerization method. This type of procedure was utilized for the covalent attachment of two hydrophilic crown ether-type potassium-selective ionophores, 4'-acryloylamidobenzo-15-crown-5 (AAB15C5) and 4'-acryloylamidobenzo-18-crown-6 (AAB18C6) (14, 15, 16), a sodium-selective ionophore, 4-tertbutyl calix[4]arene tetraacetic acid tetraethyl ester (17), a calcium ionophore, N,N-dicyclohexyl-N'-phenyl-N'-3-(2-propenoyl)oxyphenyl-3-oxapentanediamide (AU-1) (16) as well as polymerizable anion ion-exchangers (18) onto an acrylic polymer. The simplicity of this procedure constitutes an important advantage over most other methods described above. These polymers containing grafted ionophores showed comparable selectivity and improved lifetime compared to ISEs based on free, unbound ionophore.

There is a need for improved chromoionophores remedying the defects of the prior art.

SUMMARY

The present invention, according to an embodiment, is directed to the synthesis of polymerizable compositions having a pH indicator, a spacer and a polymerizable group. The polymerizable group can be an acrylate or a methacrylate. The spacer can be an oxyalkyl group, an oxypropyl group, or an oxybenzoyl group. The composition can have the structure of NB1 or NB2 shown in FIG. 1.

The present invention, according to an embodiment, is also directed to an indicating polymer comprising a copolymer of a composition having a pH indicator, a spacer and a polymerizable group; and a co-monomer. The co-monomer can comprise acrylate or methacrylate. Optionally, the co-monomer comprises methyl methacrylate and decyl methacrylate. Optionally, the co-monomer comprises poly(n-butyl acrylate).

The present invention, according to an embodiment, is also directed to an optode having an indicating polymer, the indicating polymer having: a copolymer of a composition having a pH indicator, a spacer and a polymerizable group; and a co-monomer. The optode can also have a self-plasticizing polymer. The optode can further have a grafted ionophore. Optionally, the optode is a particulate optode.

The present invention, according to an embodiment, is also directed to a method of making a copolymer having selectivity for a target ion. The method includes: providing a monomer having a pH indicator, a spacer, and a polymerizable group; combining the monomer and a co-monomer; and polymerizing the monomer and co-monomer to form a copolymer. The monomer and the co-monomer can be polymerized by thermally initiated free radical solution polymerization.

BRIEF DESCRIPTION OF THE DRAWINGS

A better understanding of the present invention will be had with reference to the accompanying drawings in which.

DETAILED DESCRIPTION

The present invention, according to an embodiment, is directed to synthesis of polymerizable Nile Blue derivatives with acrylic groups and the covalent attachment of the chromoionophores in MMA-DMA or nBA based polymers by simple one step solution polymerization.

Chromoionophores typically have different absorbance and fluorescence spectra when protonated and unprotonated, acting as lipophilic pH indicators. In bulk optodes the change of the protonation and deprotonation of the chromoionophore is related to the change of the activity of the target ions because of a competitive extraction of the two ions into the membrane phase.

Bulk optodes contain long alkyl chains to provide sufficient lipophilicity for regular ion-selective sensors. However, to improve the lifetime of the sensors and eliminate the leaching of the components into lipophilic samples during in-vivo measurements, it is important to covalently graft the chromoionopores. The present invention is directed to polymerizable chromoionophores having pH indicators in combination with spacers and polymerizable acrylic groups for preparing all-polymeric materials and eliminating this leaching problem.

Figure 1:
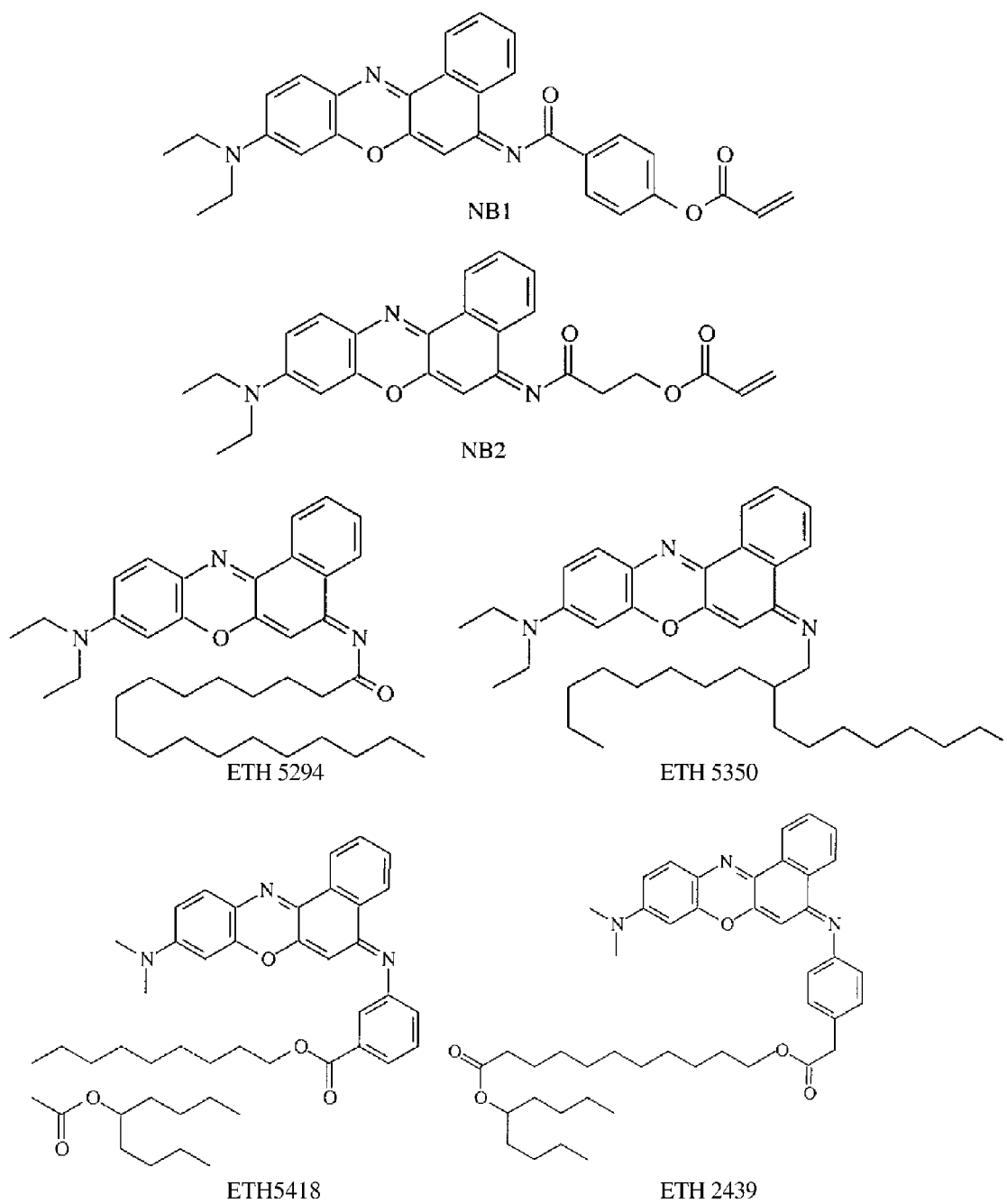
FIG. 1 contains schematic representations of commercially available Nile Blue derivates usable as $H^+$-chromo and fluoroionophores and NB1 and NB2 prepared according to embodiments of the present invention.

A pH indicator suitable for purposes of this invention is the highly basic oxazine-dye molecule Nile Blue. Nile Blue derivatives such as ETH 5294, ETH 2439, ETH 5350 and ETH 5418, which are shown in FIG. 1, are well known in the art. Other pH indicators that may be suitable for the present invention include neutral red (toluoylene red); chromoionophore X (ETH4004), 4-dioctylamino-4'-(trifluoroacetyl)stilbene; chromoionophore IV is (ETH2412) 5-octadecanoiloxy-2-(4-nitrophenylazo)phenol; chromoionophore VI (ETCH7075), 4',5'-dibromofluorescein octadecyl ester; and chromoionophore VIII (TBTE), 3',3'',5',5''-tetrabromophenylphthaleinethyel ester.

Spacers suitable for purposes this invention include oxyalkyl, oxypropyl and oxybenzoyl groups. Generally, suitable spacers have carbon chains from about 2 to about 18 carbon atoms in length.

The term "polymerizable chromoionophore" refers to a chromoionophore having a polymerizable group, which allows the chromoionophore to become covalently bonded to a copolymer. The polymerizable group is required to allow the chromoionophore to react with a reactive group of the copolymer, such as a carbon-carbon double bond, to form covalent linkages, whereby the chromoionophore becomes covalently grafted onto the copolymer. Examples of such polymerizable groups include, but are not limited to, carbon-carbon double bonds, such as acrylic and methacrylic groups, carbon-carbon triple bonds and carbonyl groups.

The term "covalently grafted chromoionophore" as used herein refers to a chromoionophore that is attached to a polymer through covalent bonds.

Polymerizable chromoionophores in accordance with the invention can be synthesized, for example, by methods described in the examples below. The method of making the polymerizable chromoionophore will typically include: (1) attaching a spacer to a polymerizable group; and (2) attaching a pH indicating dye, such as a Nile Blue derivative, to the spacer, as described in Example 1.

The terms "polymer" and "copolymer" are used interchangeably and refer to a chemical compound or mixture of compounds formed by polymerization and comprising repeating monomer units, wherein the polymer can comprise one type of monomer unit or can contain two or more different monomer units.

Preferred polymers will have adequate solubility in organic solvents so that they can be mixed with the other components and can be converted into coatings by conventional coating methods. They should furthermore be permeable to ions. The dielectric constant of the polymers is preferably from 2 to 25, particularly preferably from 5 to 15, at 100 Hz and room temperature. The optical transparency is preferably in the range of from about 400 to about 1200 nm, particularly preferably from about 400 to about 900 nm.

Suitable polymers are known to the person skilled in the art. They can be homopolymers, copolymers, block polymers, graft polymers and polymer alloys. The components of a polymer alloy may be a combination of two or more polymer components, said components having high and low glass transition temperatures. The glass transition temperature can be adjusted, for example, by means of the polarity and the chain length and content of structural units. The glass transition temperature is preferably from −130 to 0° C. Polymers with very low $T_g$ values are normally much softer and more difficult to handle mechanically. The $T_g$ is typically determined experimentally with a differential scanning calorimeter, a standard instrument for this purpose.

The polymers can be selected, for example, from the group consisting of polyolefins, polyesters, polyamides, polyethers, polyimides, polyesteramides, polyamideimides, polyurethanes, polyetherurethanes, polyesterurethanes, polyureas, polyurethaneureas and polysiloxanes, it being possible for the polymers to contain ionizable, basic groups (for example amino groups) or ionizable, acidic groups (for example carboxyl or sulfonyl groups), which may be used as replacement for a counterion of lipophilic salts and can provide improved ion transport.

Some examples of monomers for the preparation of polyolefins are $C_2$-$C_{12}$ olefins, acrylic acid, methacrylic acid, maleic acid, maleic anhydride, $C_1$-$C_{30}$ esters of acrylic and methacrylic acid, $C_1$-$C_{30}$ amides of acrylic and methacrylic acid, acrylamide and methacrylamide, vinyl esters of $C_1$-$C_{20}$ carboxylic acids, acrylonitrile, butadiene, isoprene, chlorobutadiene, styrene, α-ethylstyrene, vinyl chloride, vinyl fluoride, vinylidene chloride and vinyl ethers of $C_1$-$C_{30}$ alcohols.

Polyesters, polyesteramides and polyamides are preferably synthesized from $C_2$-$C_{12}$ dicarboxylic acids and $C_2$-$C_{18}$ diols or -diamines. Polyimides are preferably synthesized from $C_2$-$C_{18}$ tetracarboxylic acids and $C_2$-$C_{18}$ diamines. Polyethers are preferably synthesized from aliphatic $C_2$-$C_{12}$ diols (1,2- or α, ω-lining) or linear adducts of these diols and $C_8$-$C_{30}$ diglycidyl ethers. Polyurethanes and polyureas are preferably synthesized from $C_2$-$C_{18}$ diols or -diamines and $C_2$-$C_{20}$ diisocyanates and/or triisocyanates. Polysiloxanes are preferably synthesized from di($C_1$-$C_4$)alkylsilyldichlorosilanes In a preferred embodiment, the polymers comprise a copolymer of methacrylate monomers with different pendant alkyl groups $R_1$ and $R_2$, wherein $R_1$ may be any of $C_{1-3}$ alkyl group, and $R_2$ may be any of $C_{4-12}$ alkyl group.

As used herein, the term "alkyl" refers to a saturated linear or branched-chain monovalent hydrocarbon radical of one to twelve carbon atoms, wherein the alkyl radical may be optionally substituted independently with one or more substituents described below. Examples of alkyl groups include, but are not limited to, methyl, ethyl, n-propyl, isopropyl, butyl, isobutyl, sec-butyl, tert-butyl, pentyl, isopentyl, tert-pentyl, hexyl, isohexyl, and the like In accordance with embodiments of the present invention, preferably $R_1$ is a $C_{1-2}$ alkyl group, and $R_2$ is a $C_{8-12}$ alkyl group. In one embodiment, methyl methacrylate and decyl methacrylate monomers are used for forming a methyl methacrylate-decyl methacrylate (MMA-DMA) copolymer matrix of the present invention.

Methacrylate monomers of the present invention are commercially available from, for example, Polysciences, Inc. (Warrington, Pa.). Alternatively, the methacrylate monomers can be prepared by standard methods known in the art or via thermally initiated free radical solution.

In one embodiment, the chromoionophore monomer comprises a polymerizable group, and the chromoionophore is covalently grafted onto a polymer chain by copolymerizing the chromoionophore monomer with methacrylate co-monomers such as MMA and DMA monomers. In this embodiment, the copolymer may comprise a random distribution of immobilized chromoionophores within the MMA-DMA polymer chain.

Graft copolymers of the present invention comprising a covalently grafted chromoionophore may be made in accordance with methods known in the art or the methods described herein. For example, in one embodiment the graft copolymer is prepared by thermally initiated free radical solution polymerization of a mixture of methacrylate monomers and a polymerizable chromoionophore as described herein in detail in Example 3.

Alternatively, other methods known in the art may be used to covalently graft the chromoionophore. For example, a sol-gel technique may be used to prepare the graft copolymer. Another approach involves directly grafting the chromoionophore onto an existing polymer with active sites. Yet another approach involves blending two different polymers together, with one of them containing the grafted chromoionophore. Alternatively, a solution containing methacrylated monomers and the polymerizable chromoionophore can be irradiated with an electron beam to cause polymerization and covalent attachment of the polymerizable chromoionophore onto the methacrylate copolymer.

A sufficient amount of polymerizable chromoionophore is combined with the copolymer to obtain the desired improvement in desired properties of the copolymer, such as ion selectivity, faster response and recovery times and extended lifetime. Such properties may be quantitatively measured by well-known test methods.

The optimal amount of polymerizable chromoionophore required to produce a significant enhancement of such properties varies depending upon the chemical compositions, structures, and molecular weights of the components employed as well as the extent of grafting achieved. The graft copolymer typically contains the chromoionophore in, for example, an amount from about 0.01% to about 10% by weight, and preferably from about 0.1 to about 5% by weight, based on the amount of polymer. In general, however, it will be advantageous to use at least one part by weight of the polymerizable chromoionophore for every 1000 parts by weight of the copolymer.

The conditions necessary to achieve at least partial grafting of the components of the polymer composition will vary depending upon the reactivities of the individual components. For example, when the chromoionophore comprises polymerizable acrylic groups, the grafting conditions may comprise a thermal or photoinitiated co-polymerization in a solvent such as EtOAc. The graft copolymer will expediently have a mean molecular weight of at least 5,000, preferably at least 10,000 and particularly preferably at least 20,000 daltons, for example from 20,000 to 200,000 daltons, preferably from 50,000 to 200,000 daltons.

In one embodiment, the graft copolymers of this invention may be blended, admixed, or combined with other polymers to obtain blends having improved properties or performance characteristics.

For example, the polymer composition when blended with poly(vinyl chloride) or polyurethane and a plasticizer, such as bis(2-ethylhexyl)sebacate (DOS) or o-nitrophenyloctylether (NPOE), has the beneficial effect of increased mechanical robustness. The relative proportion of PVC polymer:graft polymer composition may be varied as desired, preferably from about 95:5 to about 80:20 on a weight basis.

The graft polymers and blended polymer compositions of the present invention can be adapted for use in a variety of anion-selective sensors capable of detecting the interaction of a target anion with the ionophore. For example, the graft polymers and blended polymer compositions may be used to fabricate ion-selective membranes, films or particles, which include, but are not limited to, carrier-based ion-selective electrodes (ISEs), thin film ion-specific optodes, particle-based optodes, and bulk optodes.

For example, a graft polymer of this invention may be used to fabricate polymer membranes of an ion-selective electrode (ISE) in accordance with methods described in Example 4 of the present invention or any other methods known to one skilled in the art.

Polymers of this invention may also be used to fabricate thin films to be used in a thin film ion-specific optode or to fabricate microsphere particles to be used in particle-based optodes in accordance with methods known in the art. For example, the electrodes and optodes may be prepared by solvent casting and spin coating techniques, as discussed in Examples 5 and 6.

The chromoionophores according to the invention have suitable absorption and emission wavelength ranges that allow the use of known and inexpensive light sources, for example halogen or xenon lamps or light-emitting diodes. Examples of detectors which can be employed are photodiodes. In addition to fluorescence spectroscopy, other optical measurement methods may also be used, for example, absorption spectroscopy.

The ion-detecting sensors of the present invention may be used for detecting ions of all types of body fluid samples. Examples of the samples include, but are not limited to, whole blood, spinal fluid, blood serum, urine, saliva, semen, tears, etc. The fluid sample can be assayed neat or after dilution or treatment with a buffer.

EXAMPLES

The present invention will be better understood with reference to the following examples and the discussion that follows.

Reagents. 4-hydrobenzonic acid, acryloyl chloride, thionyl chloride, N,N-dimethylformamide, carbon tetrachloride, 2-carboxyethyl acrylate, triethylamine and bis 4 (2-oxo-3-oxazolidinyl)-phosphinic chloride (B0P-C1) were reagent grade from Aldrich (Milwaukee, Wis.). Nile Blue chloride salt was obtained from Strem (Newburyport, Mass.). All solvents used for syntheses were obtained from Fisher Scientific (Pittsburgh, Pa.) and dried before using. The monomers methyl methacrylate, 99.5%, n-decyl methacrylate, 99%, n-butyl acrylate, 99%, were obtained from Polysciences, Inc. (Warrington, Pa.). The polymerization initiator 2,2'-azobisisobutyronitrile, 98%, (AIBN) was obtained from Aldrich. Ethyl acetate, dichloromethane and 1,4-dioxane were reagent grade and obtained from Fisher. Inhibitors were removed from the monomers by the reported method (19). AIBN was recrystallized from warm methanol prior to use. 9-(diethylamino)-5-octadecanoylimino-5H-benzo[a]phenoxazine (chromoionophore I, ETH 5294), ter-butylcalix[4]arene-tetrakis(N,N-dimethylthioacetamide) (lead ionophore IV), 4-tert-butylcalix[4]arene-tetraacetic acid tetraethyl ester (sodium ionophore X), sodium tetrakis[3,5-bis(trifluoromethyl) phenyl]borate (NaTFPB), o-nitrophenyloctylether (NPOE), bis(2-ethylhexyl)sebacate (DOS), high molecular weight poly(vinyl chloride), tetrahydrofuran (THF) and all salts were purchased in Selectophore or puriss quality from Fluka (Milwaukee, Wis.).

Aqueous solutions were prepared by dissolving the appropriate chloride salts in Nanopure purified water (18 MQ cm).

Example 1

Synthesis of NB1. Step one: 13.8 g (0.1 mol) of 4-hydrobenzonic acid was dissolved in mixture of a 25 mL carbon tetrachloride and 9.2 g of NaOH in 55 mL water. Subsequently, 0.12 mol of acrylate chloride was added dropwise to the cold mixture. After stirring for 6 h at room temperature, the reaction mixture was neutralized with diluted hydrochloric acid. The resulting precipitate was filtered and washed with warm water, dilute hydrochloric acid, and water. The crude product was recrystallized from ethanol. A white solid powder was obtained (yield 90%).

Step two: 9.6 g (0.05 mol) of 4-acryloyloxybenzoic acid was reacted at 45-50° C. with 30 mL of thionyl chloride containing a few drops of N,N-dimethylfomamide for 10 h, and then the excess thionyl chloride was removed under reduced pressure to give the corresponding acid chloride (yield 85%). Step three: To a solution of 317 mg (1 mmol) of basic Nile Blue in 13 mL of $CH_2Cl_2$, 242 mg (0.8 mmol) of 4-acryloyloxybenzoyl chloride dissolved in 2 mL of CH$_2$Cl2 was added.

After being stirred at room temperature for 15 min, the reaction mixture was diluted with 50 mL of $CH_2Cl_2$ and then washed with 50 mL of 0.1 M NaOH. The organic phase was filtered, the solvent evaporated, and the residue purified by flash chromatography (silica gel, ethyl acetate) and by recrystallization from ethyl acetate to yield 370 mg (0.63 mmol, 40%) of NB1. The structure of NB1 was confirmed by $^1$HNMR.

Example 2

Synthesis of NB2. To a solution of 2-carboxyethyl acrylate (0.736 g) and basic Nile Blue (0.529 g) in 30 mL of dry $CH_2Cl_2$ was added $Et_3N$ (0.8 g) at room temperature while stirring. Then, 0.612 g of BOP—Cl was added. The mixture was refluxed for 24 h. The reaction mixture was washed with 10 mL of saturated $NaHCO_3$ and water. The organic phase was obtained after separation and evaporation of the solvent. The leftover was purified using flash chromatography (1:5 EtOAc:Hexane). A solid was obtained in 31% yield after evaporation of the solvent. The structure of NB2 was confirmed by $^1$HNMR.

Example 3

Polymer Synthesis and Characterizations. All polymers were synthesized via thermally initiated free radical solution polymerization. The amount of methyl methacrylate and n-decyl methacrylate used was the same as reported previously (16, 20). For polymers containing grafted ionophores, 1 wt % of Nile Blue derivatives (20 mg), 0.78 g MMA and 0.20 g DMA were dissolved in anhydrous EtOAc. The solution was purged with $N_2$ for 20 minutes before adding 5.1 mg AIBN. The homogeneous solution was continuously stirred and the temperature was ramped to 90° C., which was maintained for 16 h. After the reaction was complete, the solvent was evaporated and the polymer was redissolved in 10 mL of dioxane.

Aliquots of polymer solution (2 mL) were added to 100 mL of distilled water under vigorous stirring. The precipitate was collected and dissolved in 25 mL of dichloromethane, followed by water removal with anhydrous $Na_2SO_4$ and filtering. The solvent was evaporated and the resultant polymer was washed with methanol to ensure the complete removal of the free ionophores. The polymer was dried under ambient laboratory conditions (yield 80%). The grafted polymers were characterized by H$^1$NMR as reported (21, 22).

The concentrations of grafted dyes were estimated from the H$^1$NMR spectrum to be 40 mmol/kg. For the polymerization with n-butyl acrylate, the EtOAc solution containing 1 g n-BA was heated at 90° C. for 30 min. The reaction temperature was decreased to 60° C. and 25 mg NB2 was added to the solution for another 16 h. This modified procedure was used to prevent the decomposition of the dye. The polymer (yield 60%) was purified and characterized as described above. The concentration of grafted NB2 was estimated from the $^1$HNMR spectrum to be 40 mmol/kg.

Example 4

ISE Membrane Preparation and Measurements. ISE membranes were prepared by dissolving chromoionophore (10 mmol/kg), NaTFPB (2 mmol/kg), PVC and plasticizer (DOS or NPOE) to give a total cocktail mass of 140 mg in 1.5 mL of THF. The cocktail of the membrane with grafted chromoionophore contained 2 mmol/kg NaTFPB, 10 wt % MMA-DMA polymer with grafted indicators, PVC and plasticizer (DOS or NPOE). Cocktails were poured into glass rings (2.2 cm i.d.) affixed onto glass microscope slides.

The solvent was evaporated overnight to give a transparent membrane. The parent membranes were then conditioned for at least 12 hours in pH buffered solutions. For pH titrations, buffer solutions are 10 mM citric acid and 10 mM boric acid with the indicated concentrations of NaCl (either 10 mM or 0.1 mM) adjusted to pH 1.5 by 1 M standard HCl, or 10 mM phosphate buffer solution with NaCl as background. The solution was titrated with a 0.1 M standard NaOH solution and a pH electrode was used to monitor the sample pH. All experimental results given are the average of at least three electrodes, with calculated standard deviations.

The sandwich membrane method (23, 24) was used to measure the pKa of the grafted chromoionophores. One single parent membrane contained 10 mmol/kg chromoionophore and 5 mmol/kg NaTFPB in PVC-DOS, PVC-NPOE or MMA-DMA polymer while the other segment contained only NaTFPB in the same matrix. For the grafted ionophore one single membrane contained 1.5 mmol/kg NaTFPB and 10 wt % MMA-DMA-NB polymer in PVC-DOS or blank MMA-DMA while the other one contained the same amount of NaTFPB in PVC-DOS or blank MMA-DMA polymer. The parent membranes were conditioned in citric acid-boric acid buffer solution overnight.

All membrane electrode potential measurements were performed at laboratory ambient temperature in unstirred salt solutions (identical to the conditioning and inner filling solution) versus a Ag/AgCl reference electrode with a 1 M LiOAc bridge electrolyte.

Example 5

Optode Film Preparation and Measurements. Optode thin films were prepared by spin-coating. The cocktails contained the free or grafted chromoionophores, PVC and plasticizer dissolved in THF. A 200-µL aliquot of the cocktail was transferred with a syringe onto a quartz disk placed in a spin-coating device (1). The resulting 2-3 µm-thick films were equilibrated in different solutions.

The absorbance spectra were recorded with an HP 8452 A diode array spectrophotometer and the fluorescence spectra were recorded by fluorescence microscopy and spectroscopy as previously reported (3, 25). Molar absorption coefficients (e) of NB1 and NB2 were measured in methanol. 2 mL of $2 \times 10$ M of NB1 or NB2 in MeOH was placed in a 1-cm quartz cell. The absorption spectrum was recorded after first adding 3 µL of 1 M NaOH and then 10 µL of 1 M HCl to obtain the unprotonated and protonated form of the chromoionophore, respectively.

For the $Pb^{2+}$ selective three-component thin-film-based optode, a total of 300 mg of membrane components containing 5 wt % NB1-MMA-DMA, 8.1 mmol/kg NaTFPB, 18.6 mmol/kg Pb (IV) ionophore and PVC/DOS (1:2) were dissolved in 1.75 mL of THF. For the Na+ selective three-component thin-film-based optode, a total of 300 mg of membrane components containing 5 wt % NB2-MMA-DMA, 10 mmol/kg NaTFPB, 20 mmol/kg Na (X) ionophore and PVC/DOS (1:2) were dissolved in 1.75 mL of THF.

The thin films were prepared and characterized by the same spin-coating device and fluorescence microscope described above. All the data points are the average of five measurements, with calculated standard deviations.

Example 6

Particle preparation and measurement. Plasticizer-free microspheres were prepared with a high-throughput particle casting apparatus previously described (25). The cocktail was prepared by weighing out ~2.09 mg (53 mmol/kg) Na ionophore (X), 0.75 mg (21 mmol/kg) NaTFPB, 11 mg grafted NB2 in PnBA (10 mmol/kg) and 25.4 mg blank PnBA dissolved in 1.5 mL cyclohexanone. The mixture was shaken in a vortex mixer for 30 min and than added dropwise to 25 mL dichloromethane under gentle stirring.

After adding 0.5 mL xylenes, the solution was filtered through a 0.45 µm Gelman filter and was transferred to a gastight Hamilton syringe. The syringe containing the polymer core solution was mounted on a syringe pump (Stoelting, Wood Dale, Ill.) and set to flow at a rate of 0.29 mL/min. Deionized water used as the sheath liquid stream flowing at a rate of 43 mL/min was controlled via a pressure regulator. The frequency generator was operated at a setting of 11.9-12.3 kHz.

A borosilicate glass microcapillary of 1.0 mm i.d. and 0.15 mm wall thickness was used for response time measurements. A 50 L aliquot of collected particles was pipetted inside the capillary cell, and the particles were then left to settle for a couple of hours. The capillary was attached at each end with polyethylene tubing, and connected to a peristaltic pump operated at a rate of 0.1 mL/min. Measurements with a fluorescence microscope (3, 26) were taken every 30-60 s or longer thereafter.

DISCUSSION OF THE EXAMPLES

The first polymerizable chromoionophore NB1 is a derivative of the highly basic oxazine-dye molecule Nile Blue attached to a acryloyloxybenzoyl group. The pH responses of NB1 based ion selective electrode ("ISE") membranes were investigated first. ISE membranes containing free NB1 were prepared. However, the chromoionophore was found to leach from the membrane during the conditioning step in contact with buffer due to insufficient lipophilicity.

Consequently, an NB1 grafted polymer was prepared by solution polymerization of NB1, MMA and DMA in ethyl acetate and with AIBN as an initiator. The purified polymers were washed, with methanol until the solution remained colorless and indicated the removal of unreacted free NB1 in the polymer. The polymers containing 1 wt % of NB1 were characterized by $^1$H-NMR. The disappearance of the signals around $\delta=6.5$-7.4 ppm for the double bond of acrylate group confirmed that no free dye was left in the polymer. It was reported earlier that the blending of an ionophore grafted MMA-DMA polymer with other polymers, such as plasticized PVC, exhibits no significant influence on the sensor response but may improve the mechanical stability of the ISE membranes (16). In this work, the same blending method was employed for initial evaluation in ISE membranes. Here, 10 wt % grafted NB1-MMA-DMA was mixed with 90 wt % PVC and DOS (1:2 by mass) to prepare the ISE membranes. No leaching of the dyes was observed during the conditioning and measurements.

Figure 2B:
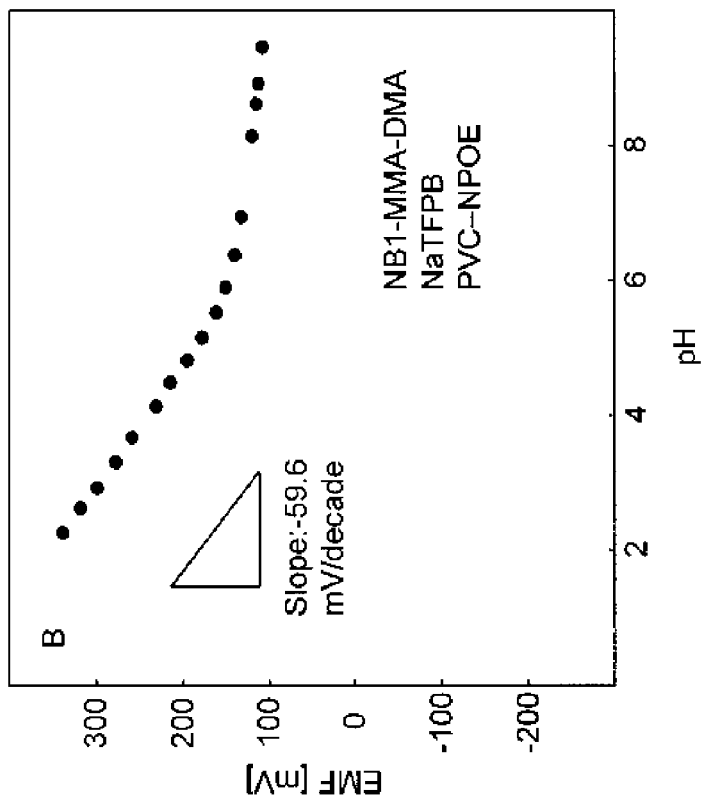
FIG. 2B is a graph of potentiometric pH responses of a NB1-MMA-DMA based PVC-NPOE membrane prepared according to an embodiment of the present invention.
Figure 2A:
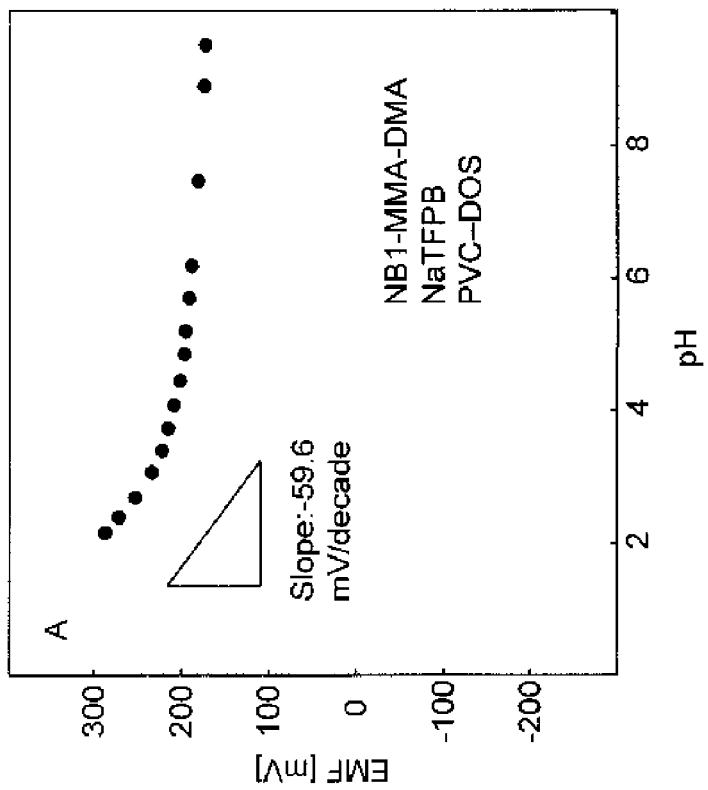
FIG. 2A is a graph of potentiometric pH responses of a NB1-MMA-DMA based PVC-DOS membrane prepared according to an embodiment of the present invention.

FIGS. 2A and 2B show the recorded pH responses of the resulting membranes. A Nernstian response was only found at pH lower than 3. For corresponding PVC-NPOE membranes, a Nernstian response was found at a pH range of about 1 to 5. The wider response range for NPOE membranes is in agreement with a higher pKa value of the dye in the NPOE based membranes. This trend has been reported earlier: the measuring range and the pKa values of chromoionophores change with different plasticizers (2, 24).

The cation selectivity of membranes based on grafted NB1 was determined according to the fixed interference method (27) by measuring the pH response curves in a 0.1 M NaCl background. The corresponding logarithmic selectivity coefficient for H⁺ over Na⁺ was calculated as log $K_{H,Na}^{pot}$=−3.1 for PVC-DOS and −5.3 for PVC-NPOE.

The relatively small ion selectivity and narrow pH response range are very different from other reported Nile Blue derivatives. This may be explained by a low pKa value of the chromoionophore or a significant binding affinity to the sodium ion interference. The pKa value of the new dye NB1 is expected to be lower than commonly used chromoionophores such as ETH 5294. The carboxyl and benzoyl groups in NB1 have a strong electron withdrawing effect and decrease the electron density on the nitrogen of the diethylamino group. The electron on this nitrogen is more delocalized than ETH 5294 and decreases the basicity of the dye.

The apparent pKa values of grafted NB1 in the membrane blends were measured by the so-called sandwich membrane method as 4.42±0.05 for PVC-DOS and 7.12±0.02 for PVC-NPOE. These data appear to largely explain the measuring range of membranes containing grafted NB1, but the ester functionality in NB1 may also be partly responsible for some alkali metal binding in analogy to earlier work (8, 20).

Figure 3B:
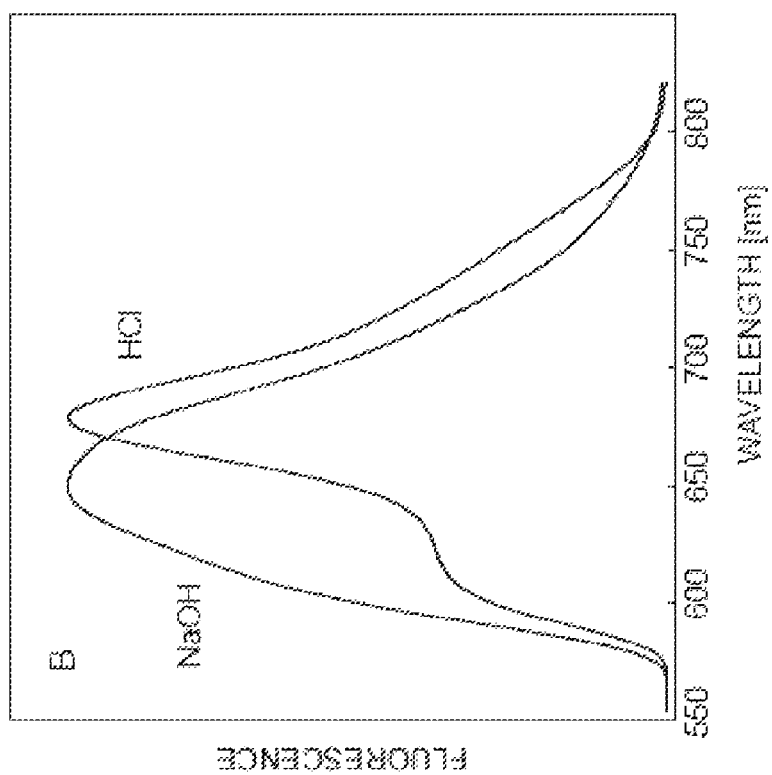
FIG. 3B shows fluorescence spectra of free NB1 in its protonated and unprotonated form in MeOH.
Figure 3A:
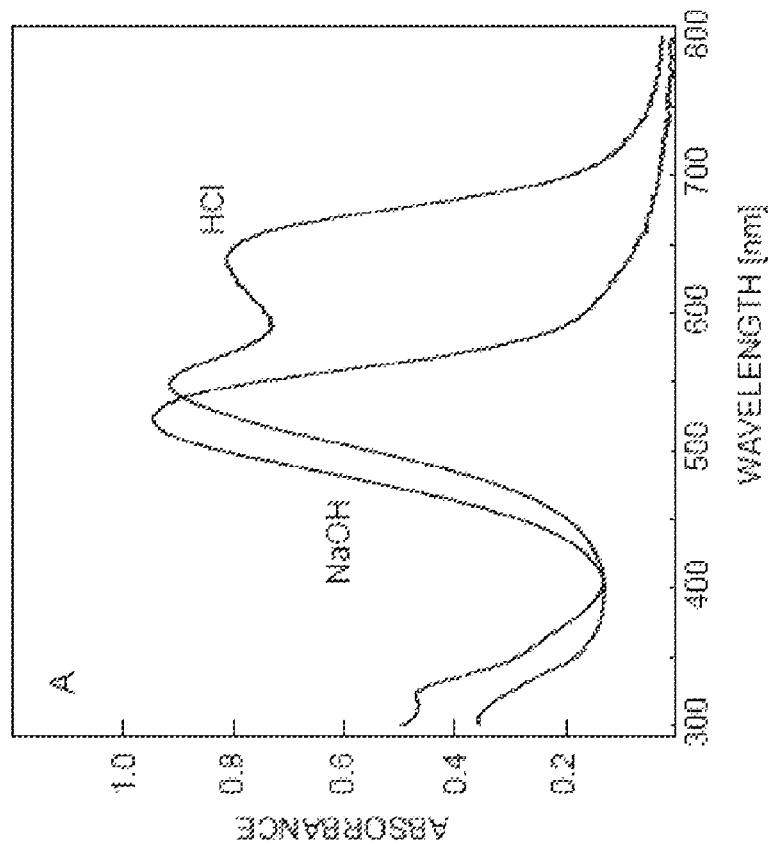
FIG. 3A shows absorbance spectra of free NB1 in its protonated and unprotonated form in MeOH.

FIG. 3A shows the absorbance spectra of NB1 in its unprotonated and protonated form in THF solution, exhibiting maxima at 510 and 560/640 nm respectively. The absorbance spectra of NB1 are very similar to those for ETH 5294. It had been reported that the chromoionophores used in bulk optodes require high molar absorption coefficient (∈). The molar absorption coefficients (∈) were found as 2.9×10⁴ L mol⁻¹cm⁻¹ (660 nm, protonated form) and 2.2×10⁴ L mol⁻¹cm⁻¹ (510 nm, deprotonated form) in methanol, measured according to the reference (2). These values are typical for Nile Blue derivatives.

The low pKa value of NB1 makes it very attractive in optical sensors for measuring transition metal ions at low sample pH. For instance, the fluorescence detection of lead ions at pH 4 aqueous solution had been reported earlier with bulk optodes (26). The optical sensors based on fluorescence measurements have a similar composition as the optodes based on absorbance mode, but require a fluorescence active pH indicator.

The azo dye ETH 5315 exhibits a pKa of 5.5 in optode membranes and would be suitable for heavy metal detection in acidic solution. Unfortunately, it shows very poor fluorescence characteristics. Since Nile Blue derivatives are normally fluorescent, ETH 5418 with a pKa value 8.8 was chosen as an alternative for lead measurement. Unfortunately, the use of ETH 5418 for fluorescence-based measurements requires the development of an inner filter approach since its basic form is not light emitting. Thus, an additional lipophilic reference dye is required. FIG. 3B shows the fluorescence spectra of grafted NB1 in MMA-DMA polymer in contact with 0.01 M HCl and 0.01 M NaOH solutions, respectively. The emission peaks at 640 nm and 680 nm correspond to the deprotonated and protonated forms of the dye.

The fluorescence spectra of grafted NB1 in the polymer matrix is therefore nearly identical to those for the popular dye ETH 5294. These attractive fluorescence characteristics of NB1 and its low pKa make it suitable for measuring lead or other transition metal ions in acidic media. Optical sensors for lead ions were fabricated to evaluate this point. In most cases reported to date, completely plasticizer-free methacrylate copolymer optode films showed slower diffusion behavior and longer response times than plasticized PVC films (28). Acceptably fast response time (<15 min) could be obtained if 10 wt % MMA-DMA polymer with covalently attached ionophore (AU-1) was mixed with DOS-PVC (28). Here, therefore, the Pb⁺ optode contained Pb-ionophore (IV), ion-exchanger NaTFPB, grafted NB1 in MMA-DMA (5 wt %) and PVC-DOS (1:2 by mass, 90 wt %).

The sensing principle employed to assess optode function is based on an ion-exchange mechanism: (29)

2IndH⁺(org)+nL(org)+Pb²⁺(aq)+2R⁻(org)⇌2Ind(org)+L_nPb²⁺(org)+2H⁺(aq)+2R⁻(org)  (1)

where Ind is a neutral chromoionophore, L is an ionophore and R⁻ the cation-exchanger, respectively. The organic sensing phase and the aqueous phase are indicated as (org) and (aq). When the optode film comes in contact with lead ions they are extracted into the film and in the process expel hydrogen ions to conserve electroneutrality within the film. The change in the degree of protonation of the fluoroionophore, which is a result of proton release from the film, leads to a measurable change in its fluorescence properties. The response of the films based on an ion-exchange equilibrium, given as a function of the experimentally accessible mole fraction of unprotonated chromoionophore, α, is given as (29):

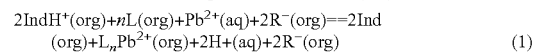

$$a_I = (z_I K_{exch})^{-1} \frac{(\alpha a_H)^{z_I}}{(1-\alpha)} \frac{R_T^- - (1-\alpha)C_T}{\{L_T - R_T^- - (1-\alpha)C_T)(n/z_I)\}^n} \quad (2)$$

where $L_T$, $C_T$ and $R_T^-$ are the total concentrations of ionophore, chromoionophore and lipophilic ion-exchanger, respectively, $Z_I$ is the charge of the analyte (here $Z_I$=2), n is the complex stoichiometry (here n=1) and $k_{exch}$ is the ion-exchange constant (to describe eq 2).

Figure 4:
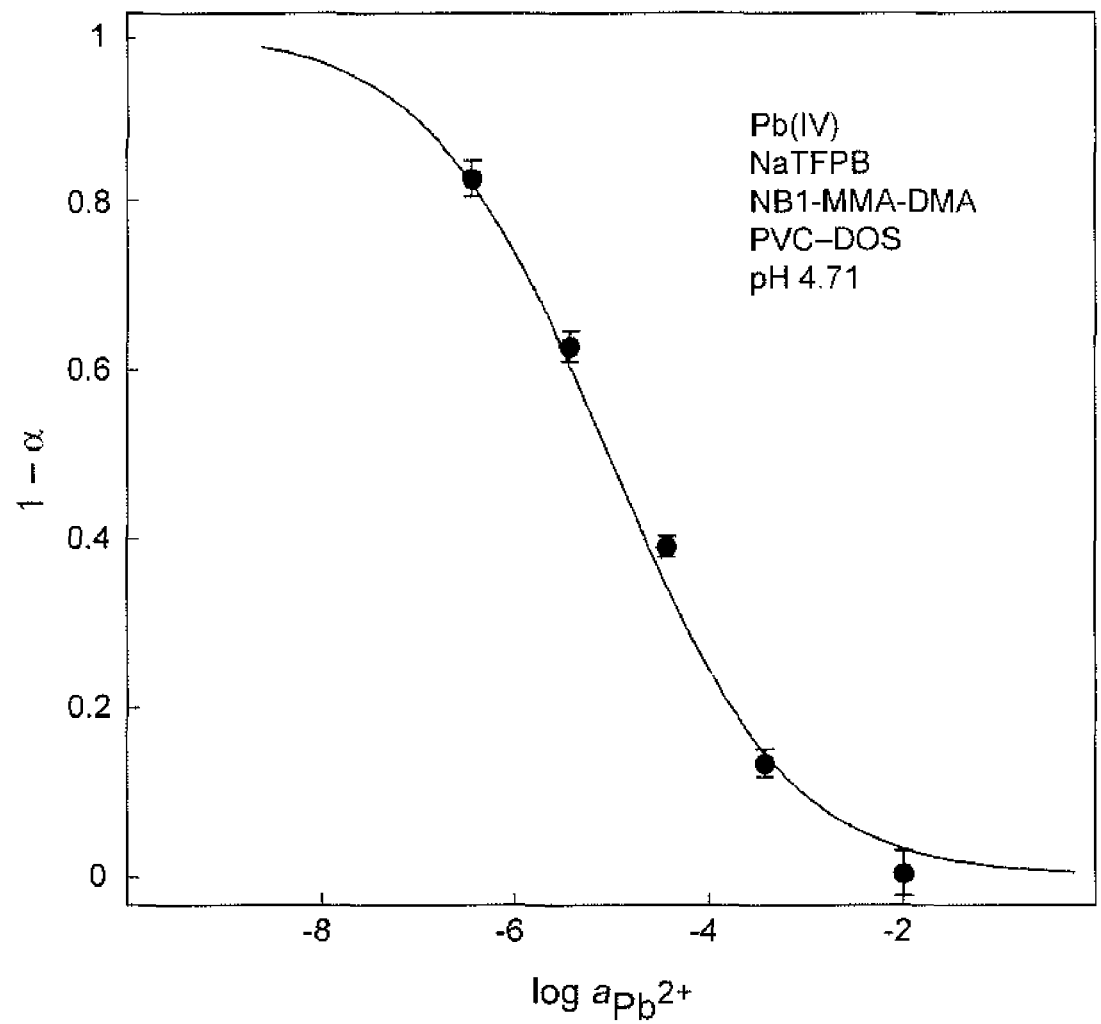
FIG. 4 is a fluorescence response curve of a $Pb^{2+}$-selective optode film containing grafted NB1-MMA-DMA, Pb-ionophore (IV), NaTFPB, PVC and DOS.

FIG. 4 shows that the experimental data correspond well to the theoretical response curve calculated with eq 2 (solid line). The dynamic lead(II) measuring range at pH 4.7 was found between 10⁻⁷ M to 10⁻³ M with a log $K_{exch}$ for Pb(II) of −4.3. This compares to a logarithmic ion-exchange constant of −2.4 for another lead optode (26) based on ETH 5418 (pKa=8.6 and 11.7 in PVC-DOS and PVC-NPOE, respectively (24)).

Figure 5B:
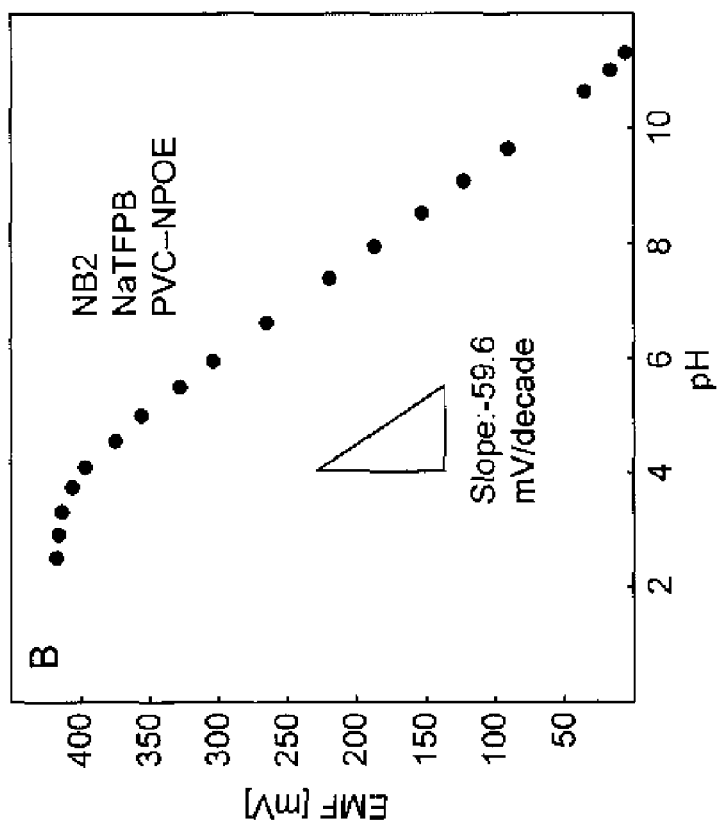
FIG. 5B is a potentiometric pH response curve of a PVC-NPOE membrane containing freely dissolved NB2.
Figure 5A:
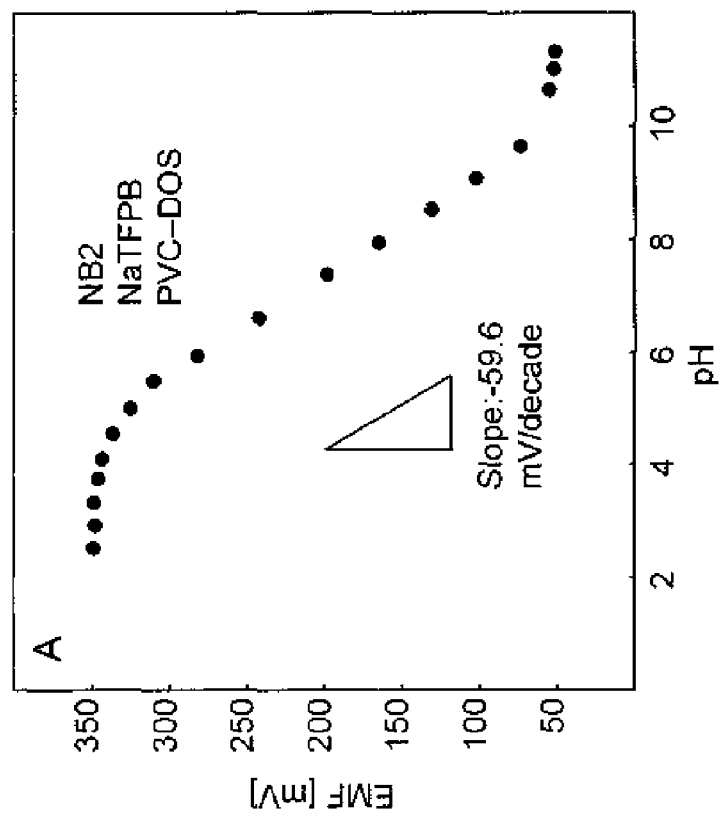
FIG. 5A is a potentiometric pH response curve of a PVC-DOS membrane containing freely dissolved NB2.

To realize optical sensors with covalently grafted chromoionophores that may operate at neutral pH, the second polymerizable chromoionophore, NB2, was synthesized. The free NB2 was found to be more lipophilic than NB1 since no obvious leaching was observed for an ISE membrane containing freely dissolved NB2. The pH responses of free NB2 in PVC-DOS and PVC-NPOE membranes were measured, as shown in FIGS. 5A and 5B.

NB2 based membranes gave Nernstian response ranges from pH 6 to 10 for DOS membranes and from pH 5 to 11 for NPOE membrane. The logarithmic selectivity coefficients for H⁺ over Na⁺ were found as −10.3 for DOS membranes and <−11 for NPOE membranes containing free NB2. The pKa values of free NB2 in DOS and NPOE membranes determined by the sandwich method were determined as 10.10±0.02 (DOS) and 12.49±0.02 (NPOE), which are just somewhat smaller than those of ETH 5294 (11.4 and 14.8, respectively, with the same method. The difference may be caused by the inductive effect of the ester in NB2 which is not present in ETH 5294.

Figure 6B:
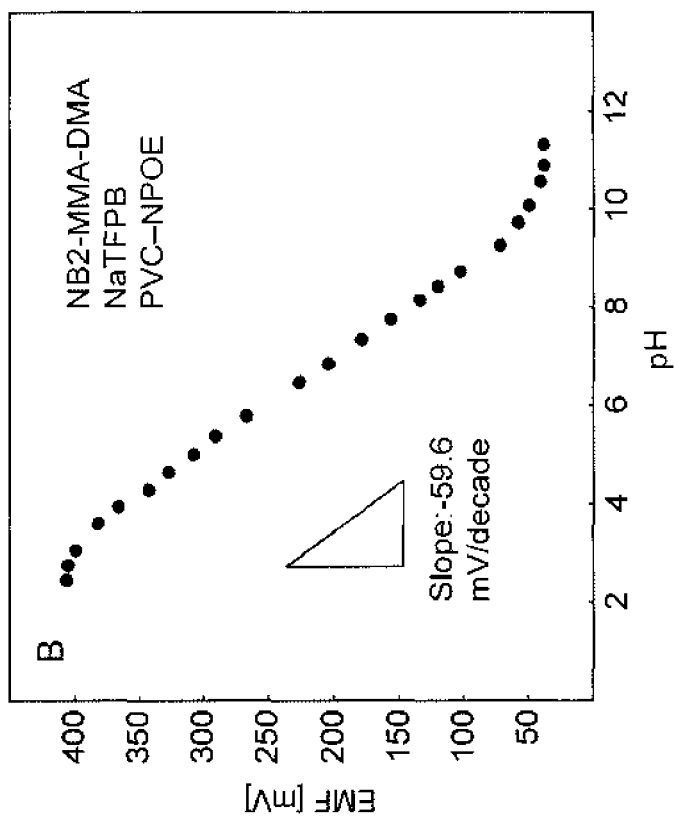
FIG. 6B is a potentiometric response curve of a grafted NB-2-MMA-DMA based PVC-NPOE membrane.
Figure 6A:
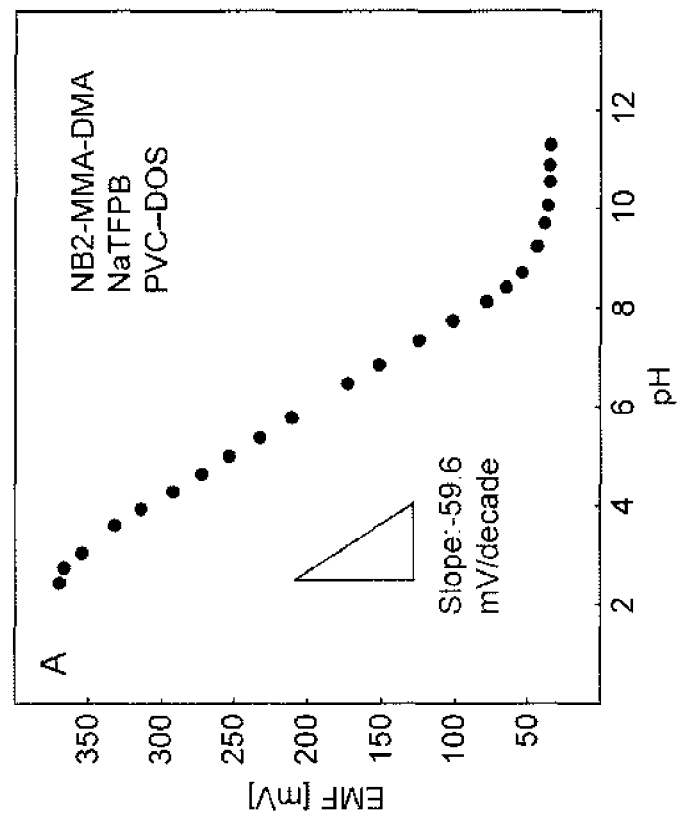
FIG. 6A is a potentiometric response curve of a grafted NB-2-MMA-DMA based PVC-DOS membrane.

NB2 was covalently grafted into a MMA-DMA polymer matrix by the same solution polymerization method used above. FIG. 6 shows the pH responses of the grafted NB2 based membranes blended with PVC-DOS or PVC-NPOE. The Nernstian pH response ranges were found between pH 3 and 8 for DOS membranes and pH 4 and 9 for NPOE membranes. The apparent pKa values of free NB2 in DOS and NPOE membranes determined by the sandwich method were 9.2±0.02 (DOS) and 11.24±0.02 (NPOE).

For grafted NB2-MMA-DMA membrane the logarithmic selectivity coefficient for $H^+$ over $Na^+$ were found as −8.8 for DOS membrane and −9.3 for NPOE membrane. The somewhat diminished selectivity compared to membranes containing free NB2 may be partly explained by the influence of the methacrylate type copolymer, which possesses some ion binding properties originating from its ester functionalities. The absorbance properties of NB2 were characterized in THF solutions as shown in FIG. 7A. Similar to NB1 and ETH 5294, NB2 also exhibits peaks at 550 nm and 610/670 nm for its deprotonated and protonated form, respectively. The values of $\in$ for NB2 in methanol were determined as $3.5 \times 10$ (660 nm, protonated form) and $2.8 \times 10^4$ (550 nm, deprotonated form), which are quite close to the reported values for ETH 5294 (2).

Figure 7B:
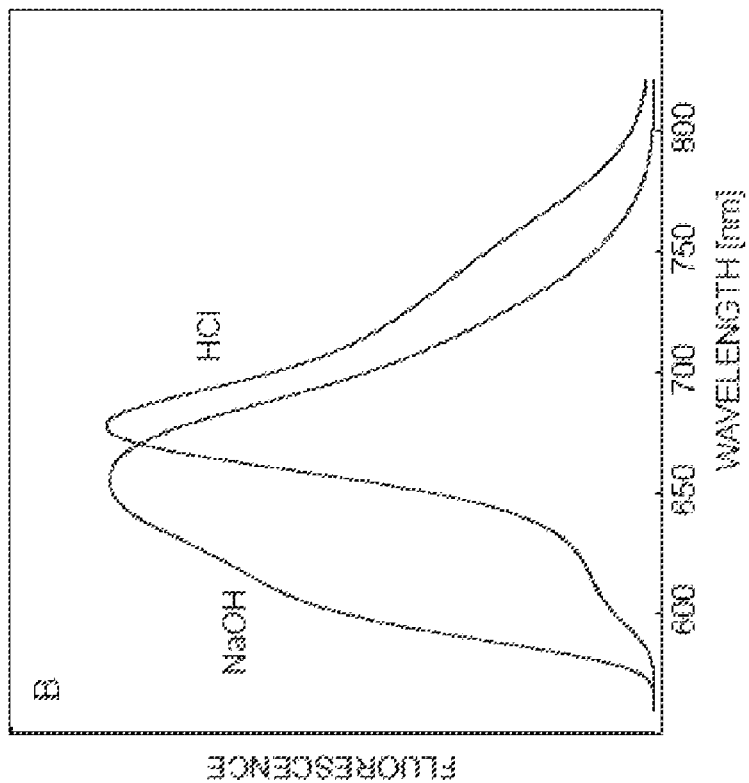
FIG. 7B shows the fluorescence spectra of free NB2 in its protonated and unprotonated form in MeOH.
Figure 7A:
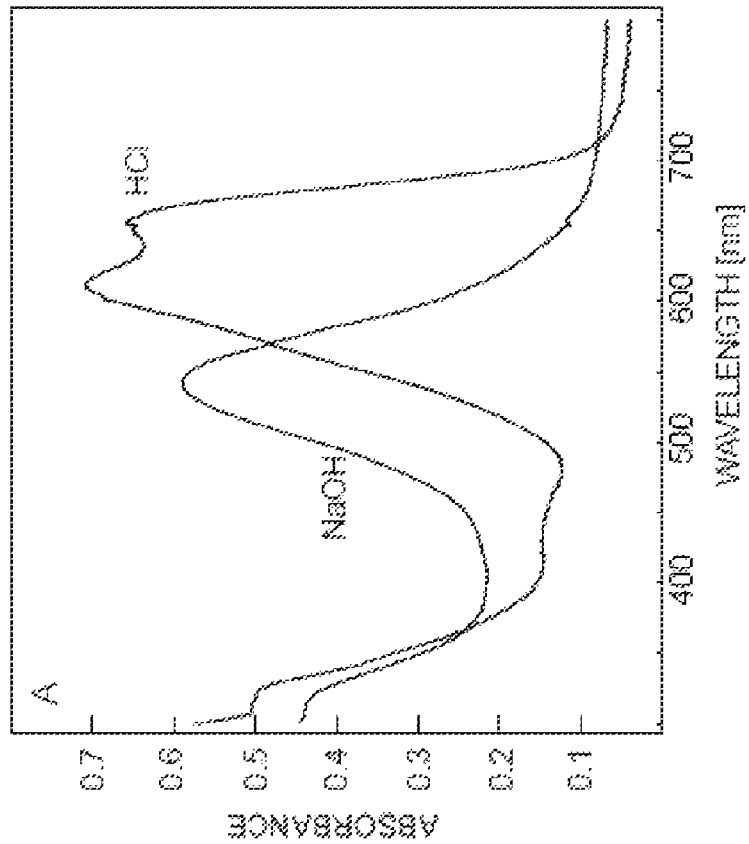
FIG. 7A shows the absorbance spectra of free NB2 in its protonated and unprotonated form in MeOH.

FIG. 7B presents the fluorescence spectra of free NB2 based PVC-DOS films in contact with HCl and NaOH solutions. The peaks at 640 nm and 680 nm correspond to the emission maxima of the deprotonated and protonated forms of the dye, respectively. The fluorescence spectrum of NB2 in the polymer matrix is also nearly identical to that of ETH 5294 (3, 30).

The results indicate that the covalent attachment does not change the fluorescence properties of the chromoionophore and that grafted NB2 may be used as a H+-fluoroionophore for the detection of fluorescence ratios with optodes measured at neutral pH. In example 5, Na-selective optode thin films were prepared. The films contained NB2-MMA-DMA, sodium ionophore Na—X and NaTFPB. The sensing principle employed to assess optode function is based on the same basic ion-exchange mechanism described above (with $z_I=1$ and $n=1$ in eq 2).

Figure 8:
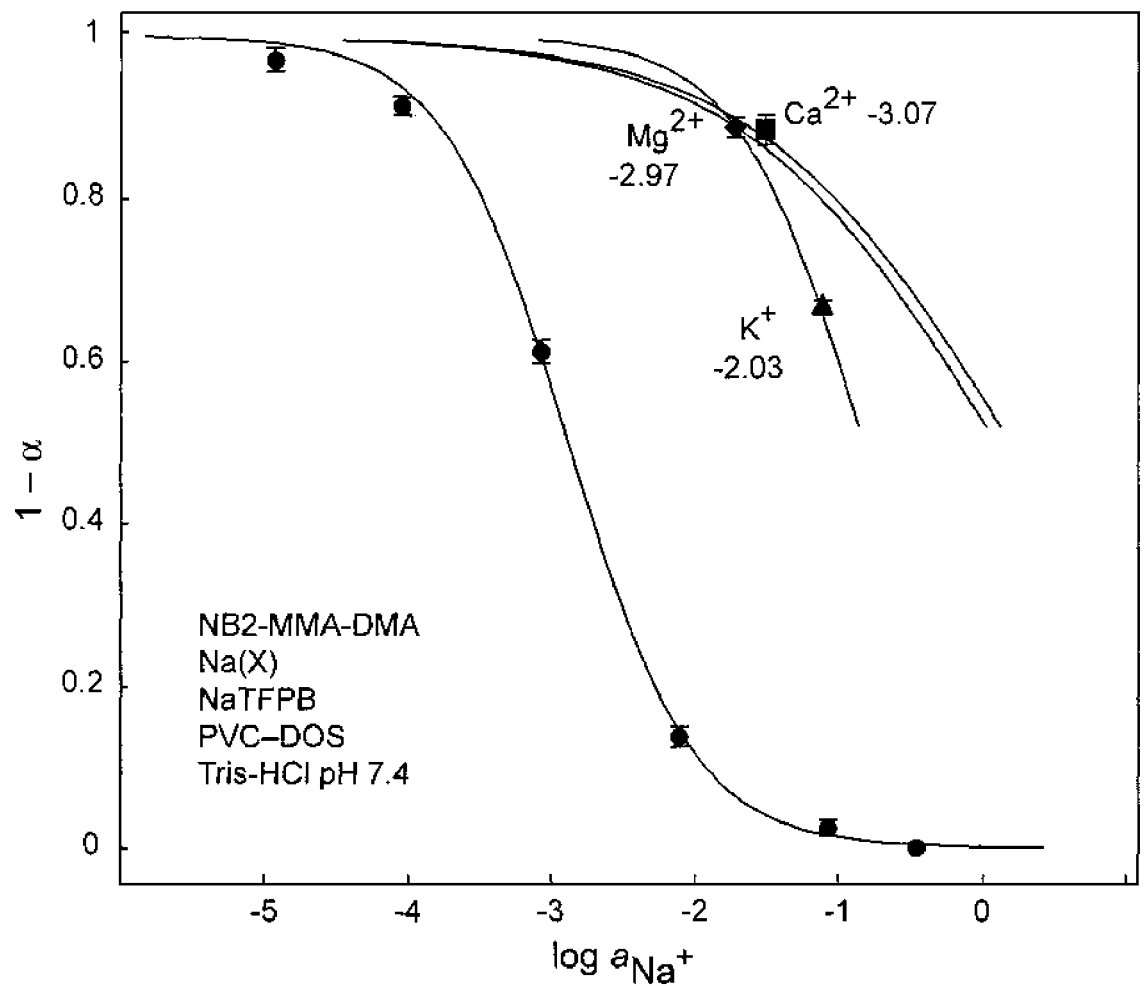
FIG. 8 is a chart of fluorescence response curves and observed selectivity of optode films containing NB2-MMA-DMA, Na(X), and NaTFPB towards sodium (open circles), magnesium, potassium and calcium ions at pH 7.4.

The response curve of an optode film towards $Na^+$ and the corresponding selectivity behavior are presented in FIG. 8. The data points correspond to mean experimental values (n=3) with the error bars denoting standard deviations. The solid lines describe the theoretical curves according to eq 2. The response curve observed with NB2-MMA-DMA films corresponds well to the theoretically predicted behavior, which confirms that the fluoroionophore remains fully functional in its covalently bound state. The observed ion-exchange constant was found as log $K_{exch}=-4.5$, which compares with −6.3 (experimental value) for films containing the same Na ionophore and ion-exchanger but the more basic chromoionophore ETH 5294. The difference between the two log $K_{exch}$ values corresponds well to the difference of their pKa values. Magnesium, potassium and sodium ions were all well discriminated as indicated by the dotted lines in FIG. 8. The selectivity was characterized in 1 M cation chloride salts solution at the same pH as for the sodium curve. The logarithmic selectivity coefficient for sodium over potassium, magnesium and calcium ions were found as −2.03, −2.97 and −3.07 respectively (at half protonation of the chromoionophore). The respective logarithmic values for these three interfering ions correspond well to literature values (31, 32).

In past studies, completely plasticizer-free methacrylate copolymer optode films often showed slower diffusion behavior and much longer response time than plasticized PVC films. The response time of microspheres composed of MMA-DMA was found to be as long as 12 h (28). To shorten the response time Poly n-butyl acrylate (PnBA) may be used as "internal plasticizer" for preparing plasticizer-free sensors. Due to its low Tg and high fluidity, PnBA alone is not suitable for making ISE membranes but has to be used together with other, higher Tg polymers. However, poly(n-butyl acrylate) was found to be suitable for the preparation of plasticizer-free microspheres and the diffusion is rapid in this matrix.

Figure 9:
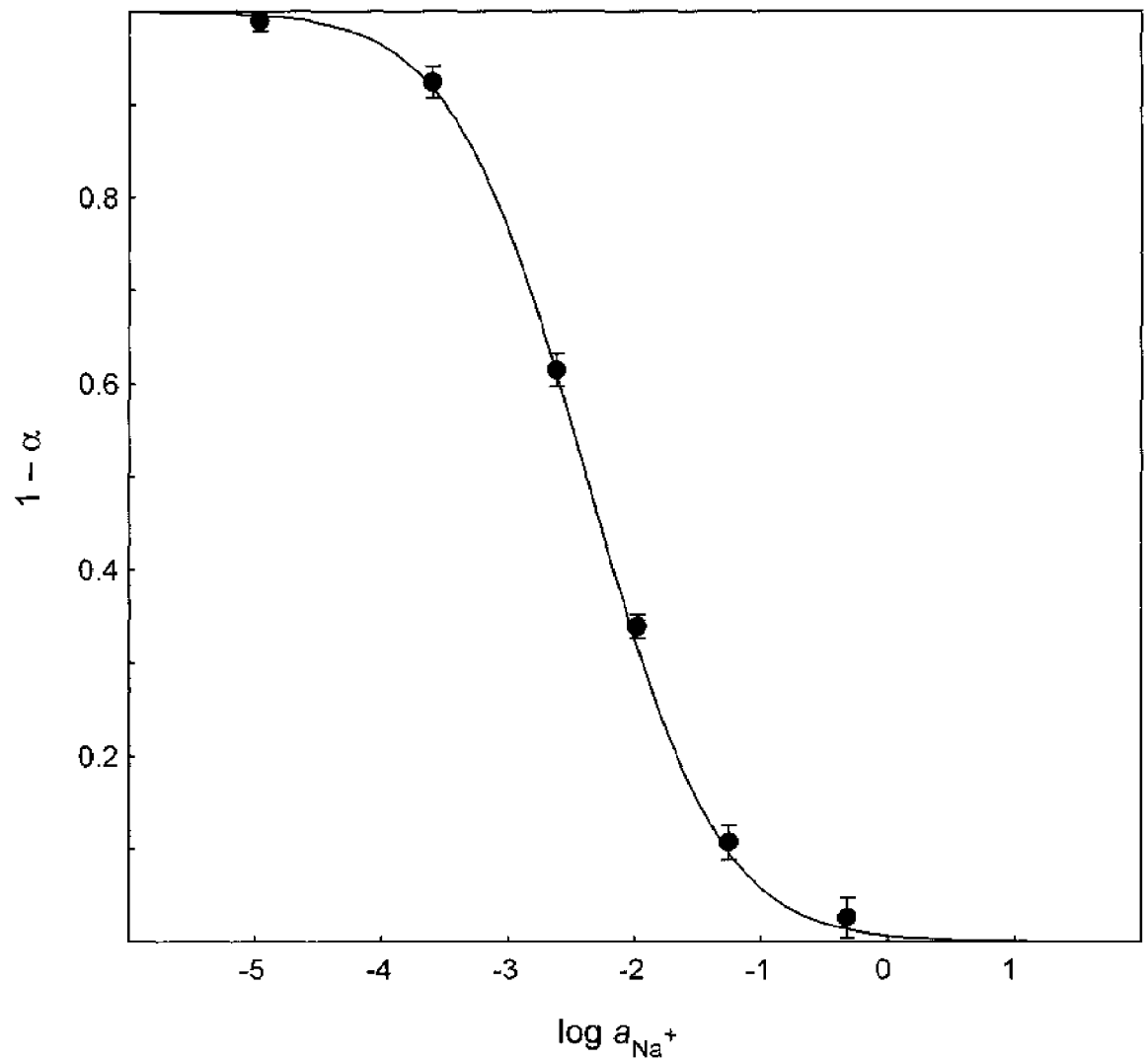
FIG. 9 is a chart of fluorescence response curves and selectivity of 10-μm diameter optode microspheres containing NB2-MMA-DMA, poly(n-butyl acrylate), Na(X), and NaTFPB to sodium ions.

In example 6, poly(n-butyl acrylate) with grafted NB2 was prepared by copolymerization of NB2 and n-butyl acrylate, in EtOAc. The resulting PnBA particles were mass fabricated using a high-throughput particle casting apparatus previously described (25). FIG. 9 presents the fluorescence response of the PnBA particles to sodium ions. The particles contained the ionophore Na—X, NaTFPB, NB2-PnBA and blank PnBA. The response of the particles is compared to that of analogous spin coated films discussed above. Each data point is the average of 10 measurements and solid lines are the theoretically predicted responses according to eq 2.

Figure 10:
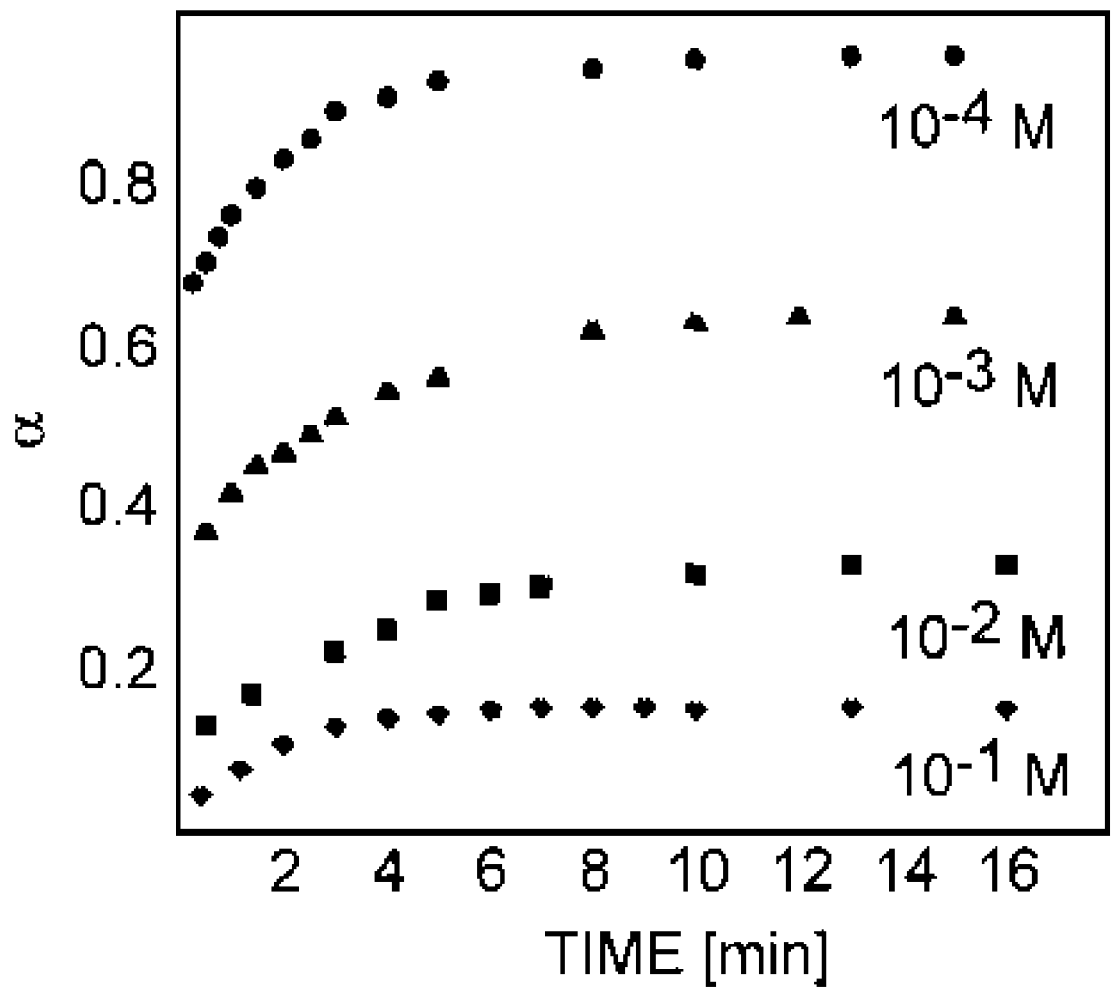
FIG. 10 is a chart of typical response times of a single sensing microsphere of FIG. 9 deposited on the bottom of a glass capillary cell and characterized in the flowing stream of changing sodium ion concentrations.

The particles have the same selectivity sequence as the thin film-based optodes. The exchange constants and selectivities are also very similar to thin film optodes, suggesting that the particles function in complete analogy to the thin films. FIG. 10 displays typical response times of a single sensing particle deposited on the bottom of a glass capillary cell and characterized in the flowing stream of changing sodium ion concentrations. As seen in FIG. 10, the equilibrium response for a 10 μm particle is reached essentially within 10 min, which is dramatically decreased compared to the earlier reported 12 hours and acceptable for many clinical and biomedical applications.

Two polymerizable Nile Blue derivatives (NB1 and NB2) were synthesized. They exhibit similar absorbance and fluorescence spectra as the established Nile Blue derivative ETH 5294. The structural variations between the two dyes results in widely different pKa values and a large shift in the measuring range of the resulting sensing films. Upon covalent attachment of the dyes in the polymer matrix, the new materials may be successfully used as pH indicators and fluoroionophores in ion-selective optodes.

NB1-MMA-DMA exhibits a low pKa value and two fluorescence emission peaks, and appears to be a better suited chromoionophore than ETH 5418 for the fabrication of transition metal selective optodes operating at low pH values and/or low analyte concentrations. NB2-MMA-DMA blended with PVC-DOS or NPOE is suitable for preparing ion-optodes used at near-neutral pH for the measurement of more abundant ions (especially alkali and alkaline earth metal ions).

NB2 can also be copolymerized with PnBA to prepare polymers with faster response times. The first reported hydrophobic bulk optodes containing a grafted NB2 and no plasticizer were prepared using NB2-MMA-DMA and exhibited a functional $Na^+$ response according to classical optode theory, with fast response times. The selectivity observed over common interferences such as Ca, $K^+$, and $Mg^+$ was found to be high.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

REFERENCES

1. Seiler, K.; Simon, W., *Sens. Actuators B* 1992, 6, 295-298.
2. Bakker, E.; Lerchi, M.; Rosatzin, T.; Rusterholz, B.; Simon, W., *Anal. Chim. Acta* 1993, 278, 211-225.
3. Tsagkatakis, I.; Peper, S.; Retter, R.; Bell, M.; Bakker, E., *Anal. Chem.* 2001, 73, 6083-6087.
4. Brasuel, M.; Kopelman, R.; Miller, T. J.; Tjalkens, R.; Philbert, M. A., *Anal. Chem.* 2001, 73, 2221-2228.
5. Brasuel, M.; Kopelman, R.; Philbert, M. A.; Aylott, J. W.; Clark, H.; Kasman, I.; King, M.; Monson, E.; Sumner, J.; Hoyer, M.; Miller, T. J.; Tjalkens, R., *Optical Biosensors* 2002, 497-536.
6. Lindner, E.; Rosatzin, T.; Jeney, J.; Cosofret, V. V.; Simon, W.; Buck, R., /. *Electroanal. Chem.* 1993, 352, 309-312.
7. Lindner, E.; Cosofret, V. V.; Kusy, R. P.; Buck, R. P.; Rosatzin, T.; Schaller, U.; Simon, W.; Jeney, J.; Toth, K.; Pungor, E., *Talanta* 1993, 40, 957-967.
8. Puntener, M.; Fibbioli, M.; Bakker, E.; Pretsch, E., *Electroanalysis* 2002, 14, 1329-1338.
9. Reinhoudt, D. N.; Engbersen, J. F. J.; Brzozka, Z., *Anal. Chem.* 1994, 66, 3618-3623.
10. Hogg, G.; Lutze, O.; Cammann, K., *Anal. Chim. Acta* 1996, 335, 103-109.
11. Kimura, K.; Sunagawa, T.; Yokoyama, M., *Anal. Chem.* 1997, 69, 2379-2383.
12. Kimura, K.; Sunagawa, T.; Yajima, S.; Miyake, S.; Yokoyama, M., *Anal. Chem.* 1998, 70, 4309-4313.
13. Kimura, K.; Yajima, S.; Takase, H.; Yokoyama, M.; Sakurai, Y., *Anal. Chem.* 2001, 73, 1605-1609.
14. Heng, L. Y.; Hall, E. A. H., *Electroanalysis* 2000, 12, 178-186.
15. Heng, L. Y.; Hall, E. A. H., *Electroanalysis* 2000, 12, 187-193.
16. Qin, Y.; Peper, S.; Radu, A.; Bakker, E., *Anal. Chem.* 2003, 75, 3038-3045.
17. Malinowska, E.; Gawart, L.; Parzuchowski, P.; Rokicki, G.; Brzozka, Z., *Anal. Chirn. Acta* 2000, 421, 93-101.
18. Qin, Y.; Bakker, E., *Anal. Chem.* 2003, 75, 6002-6010.
19. Horn, M. B., *Acrylic Resins*, Reinhold Publishing Corp.: New York, 1960.
20. Qin, Y.; Peper, S.; Bakker, E., *Electroanalysis* 2002, 13, 1375-1382.
21. Heng, L. Y.; Hall, E. A. H., *Anal. Chim. Acta* 2001, 443, 25-40.
22. Qin, Y.; Bakker, E., *Anal. Chem.* 2004, 76, 4379-4386.
23. Mi, Y.; Bakker, E., *Anal. Chem.* 1999, 71, 5279-5287.
24. Qin, Y.; Bakker, E., *Talanta* 2002, 58, 909-918.
25. Tsagkatakis, I.; Peper, S.; Bakker, E., *Anal. Chem.* 2001, 73, 315-320.
26. Telting-Diaz, M.; Bakker, E., *Anal. Chem.* 2002, 74, 5251-5256.
27. Bakker, E.; Biihlmann, P.; Pretsch, E., *Chem. Rev.* 1997, 97, 3083-3132.
28. Peper, S.; Ceresa, A.; Qin, Y.; Bakker, E., *Anal. Chim. Acta* 2003, 500, 127-136.
29. Lerchi, M.; Bakker, E.; Rusterholz, B.; Simon, W., *Anal. Chem.* 1992, 64, 1534-1540.
30. Shortreed, M.; Bakker, E.; Kopelman, R., *Anal. Chem.* 1996, 68, 2656-2662.
31. Seiler, K.; Simon, W., *Anal. Chim. Acta* 1992, 266, 73-87.
32. Chan, W. H.; Lee, A. W. M.; Lee, C. M.; Yau, K. W.; Wang, K., *Analyst* 1995, 120, 1963-1967.

What is claimed is:

1. A composition comprising a pH indicator; a polymerizable group; and a spacer therebetween, wherein structure of the composition is selected from the group consisting of:

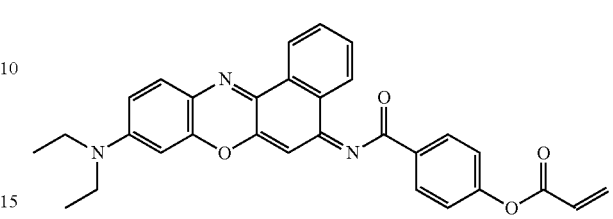

NB1 and

NB2

2. The composition of claim 1 wherein the pH indicator is a Nile Blue derivative.

3. The composition of claim 1 wherein the polymerizable group is an acrylate or a methacrylate.

4. The composition of claim 2 wherein the spacer is an oxyalkyl group.

5. The composition of claim 2 wherein the spacer is an oxypropyl group.

6. The composition of claim 2 wherein the spacer is an oxybenzoyl group.

7. The composition of claim 1 having the structure:

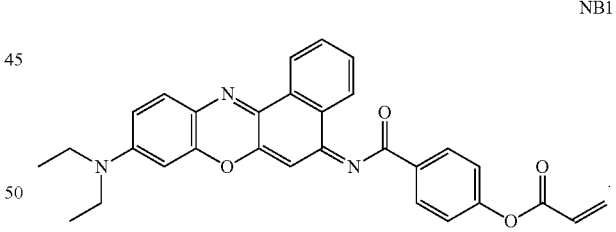

NB1

8. The composition of claim 1 having the structure:

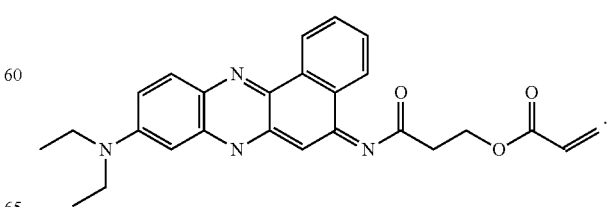

NB2

9. A polymer formed by polymerizing the composition of claim 1.

10. An indicating polymer formed by copolymerizing the composition of claim 1 with a polymerizable monomer.

11. An indicating polymer comprising a copolymer of the composition of claim 1 and a co-monomer unit.

12. The polymer of claim 11 wherein the pH indicator is a Nile Blue derivative.

13. The polymer of claim 11 wherein the co-monomer is selected from the group consisting of acrylates and methacrylates.

14. The polymer of claim 11 wherein the co-monomer is selected from the group consisting of methyl methacrylate and decyl methacrylate.

15. The polymer of claim 11 wherein the co-monomer comprises n-butyl acrylate.

16. An optode for indicating pH comprising the polymer of claim 11.

17. The optode of claim 16 further comprising a self-plasticizing polymer.

18. The optode of claim 16 further comprising a grafted ionophore.

19. A particulate optode comprising: an indicating polymer, the indicating polymer comprising at least one structure selected from the group consisting of:

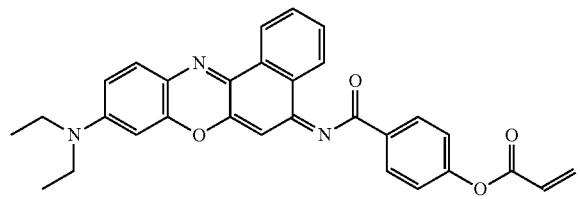

NB1 and

NB2 and poly(n-butyl acrylate).

20. The particulate optode of claim 19 further comprising a grafted ionophore.

21. A method of making a copolymer having selectivity for a target ion, comprising:
providing a monomer comprising a pH indicator, a spacer, and a polymerizable group, wherein structure of the monomer is selected from the group consisting of

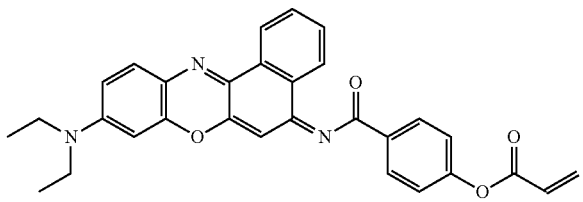

NB1 and

NB2 combining the monomer and a co-monomer; and
polymerizing the monomer and co-monomer to form a copolymer.

22. The method of claim 21 wherein the monomer and the co-monomer are polymerized by thermally initiated free radical solution polymerization.

* * * * *